(12) United States Patent
Vail et al.

(10) Patent No.: US 11,487,068 B2
(45) Date of Patent: Nov. 1, 2022

(54) ADJUSTABLE GRID TRACKING TRANSMITTERS AND RECEIVERS

(71) Applicant: NeoPhotonics Corporation, San Jose, CA (US)

(72) Inventors: Edward C. Vail, Menlo Park, CA (US); Milind Gokhale, Palo Alto, CA (US)

(73) Assignee: NeoPhotonics Corporation, San Jose, CA (US)

( * ) Notice: Subject to any disclaimer, the term of this patent is extended or adjusted under 35 U.S.C. 154(b) by 348 days.

(21) Appl. No.: 15/287,825

(22) Filed: Oct. 7, 2016

(65) Prior Publication Data

US 2017/0023753 A1 Jan. 26, 2017

Related U.S. Application Data

(63) Continuation of application No. 13/951,678, filed on Jul. 26, 2013, now Pat. No. 9,482,862.

(51) Int. Cl.
*G02B 6/42* (2006.01)
*G02B 6/43* (2006.01)
(Continued)

(52) U.S. Cl.
CPC ............ *G02B 6/43* (2013.01); *G02B 6/2938* (2013.01); *G02B 6/29301* (2013.01);
(Continued)

(58) Field of Classification Search
CPC ... G02B 6/34; G02B 6/43; G02B 6/12; G02B 6/12014; G02B 6/12021; G02B 6/12026;
(Continued)

(56) References Cited

U.S. PATENT DOCUMENTS 5,078,514 A 1/1992 Valette et al.
5,732,171 A 3/1998 Michel et al.
(Continued)

FOREIGN PATENT DOCUMENTS

CN 103633558 A 3/2014
EP 1073227 A2 7/2000
(Continued)

OTHER PUBLICATIONS

International Search Report and Written Opinion for co-pending international application No. PCT/US2014/043650 dated Nov. 30, 2016 (9 pages).
(Continued)

*Primary Examiner* — Thomas A Hollweg
*Assistant Examiner* — Mary A El-Shammaa
(74) *Attorney, Agent, or Firm* — Christensen, Fonder, Dardi & Herbert PLLC; Peter Dardi; Peder Jacobson (57) ABSTRACT

Optical telecommunication receivers and transmitters are described comprising dispersive elements and adjustable beam steering elements that are combined to provide optical grid tracking to adjust with very low power consumption to variations in the optical grid due to various changes, such as temperature fluctuations, age or other environmental or design changes. Thus, high bandwidth transmitters or receivers can be provides with low power consumption and/or low cost designs.

24 Claims, 8 Drawing Sheets

(51) Int. Cl.
*G02B 26/08* (2006.01)
*H04B 10/50* (2013.01)
*G02B 6/35* (2006.01)
*G02B 6/293* (2006.01)

(52) U.S. Cl.
CPC ..... *G02B 6/29304* (2013.01); *G02B 6/29398* (2013.01); *G02B 6/3518* (2013.01); *G02B 6/4214* (2013.01); *G02B 26/0816* (2013.01); *G02B 26/0833* (2013.01); *H04B 10/50* (2013.01); *H04B 10/503* (2013.01); *G02B 6/4286* (2013.01)

(58) Field of Classification Search
CPC ............... G02B 6/124; G02B 6/02057; G02B 6/02061; G02B 6/02076; G02B 6/10; G02B 6/12007; G02B 6/3512; G02B 6/3518; G02B 6/12009; G02B 6/12011; G02B 6/12016; G02B 6/12019

See application file for complete search history.

(56) References Cited

U.S. PATENT DOCUMENTS

| | | | |
|---|---|---|---|
| 6,615,615 B2 | 9/2003 | Zhong et al. | |
| 6,647,182 B2 | 11/2003 | Sappey et al. | |
| 6,697,552 B2 | 2/2004 | McGreer et al. | |
| 6,738,545 B1 | 5/2004 | Purchase et al. | |
| 6,914,916 B2 | 7/2005 | Pezeshki et al. | |
| 6,959,129 B2 | 10/2005 | He et al. | |
| 7,016,594 B1 | 3/2006 | Godil et al. | |
| 7,160,746 B2 | 1/2007 | Zhong et al. | |
| 7,199,924 B1 | 4/2007 | Brown et al. | |
| 7,224,855 B2 | 5/2007 | Iazikov et al. | |
| 7,272,273 B2 | 9/2007 | Yan et al. | |
| RE40,271 E | 4/2008 | Sappey et al. | |
| 7,709,354 B2 | 5/2010 | Stowe et al. | |
| 7,952,695 B2 | 5/2011 | Crafts et al. | |
| 8,170,384 B1* | 5/2012 | Riza | G02B 6/2861 385/27 |
| 2003/0043471 A1* | 3/2003 | Belser | G02B 6/2931 359/634 |
| 2005/0180691 A1* | 8/2005 | Marti Sendra | G02B 6/12019 385/37 |
| 2005/0249509 A1* | 11/2005 | Nagarajan | B82Y 20/00 398/198 |
| 2007/0160321 A1* | 7/2007 | Wu | G02B 6/12007 385/24 |
| 2008/0056723 A1 | 3/2008 | Giles et al. | |
| 2008/0138070 A1 | 6/2008 | Yan et al. | |
| 2009/0046288 A1* | 2/2009 | Crafts | G01J 3/18 356/328 |
| 2010/0177793 A1 | 7/2010 | Rossi et al. | |
| 2011/0228374 A1* | 9/2011 | Ooba | G02B 6/12021 359/238 |
| 2011/0229080 A1* | 9/2011 | Bulthuis | G02B 6/12011 385/37 |
| 2011/0293279 A1 | 12/2011 | Lam et al. | |
| 2012/0236216 A1* | 9/2012 | Sharma | G02B 26/02 349/1 |
| 2012/0308176 A1* | 12/2012 | McGinnis | G02B 6/12014 385/14 |
| 2013/0058370 A1* | 3/2013 | Chang-Hasnain | B82Y 20/00 372/50.11 |
| 2013/0243432 A1 | 9/2013 | McGreer | |
| 2014/0112621 A1* | 4/2014 | Shen | G02B 6/1203 385/37 |

FOREIGN PATENT DOCUMENTS

| | | |
|---|---|---|
| EP | 2391039 A2 | 11/2011 |
| JP | 2001-44970 A | 2/2001 |

OTHER PUBLICATIONS

Amersfoort et al., "Phased-array wavelength demultiplexer with flattened wavelength response," Electronics Letters, 30(4):300-302, (Feb. 1994).
Betty, "Stongly-Guided InP/In[1-x]Ga[x]As[y]P[1-y] Mach-Zehnder Modulator for Optical Communications", University of Waterloo thesis, Waterloo, Ontario, Canada, 2005, (248 pages).
Birks et al., "Endlessly single-mode photonic crystal fiber," Optics Letters, vol. 22(13)1961-963. (Jul. 1997).
Chang-Hasnain et al., "Multiplewavelength tunable surface-emitting laser arrays," IEEE Journal of Quantum Elect., 27(6):1368-1376, (1991).
Cole et al., "Photonic Integration for High-Volume, Low-Cost Applications," IEEE Communications Magazine, pp. S16-S22, (Mar. 2009).
Dragone et al., "Integrated Optics N x N Multiplexer on Silicon," IEEE Photonics Technology Letters, 3(10):896-899, (Oct. 1991).
Feng et al., "Fabrication Insensitive Echelle Grating in Silicon-on-Insulator Platform," IEEE Photonics Technology Letters, 23(5):284-286, Mar. 2011.
Kang et al., "Monolithic germanium/silicon avalance photodiodes with 340 GHz fain-bandwidth product," Nature Photonics, vol. 3, Jan. 2009, p. 59-63.
Koebele et al., "Two mode transmission at 2×100Gb/s, over 40km-long prototype few-mode fiber, using LCOS-based programmable mode multiplexer and demultiplexer," Optics Express, 19(17):16593-16600, (Aug. 2011).
Maeda et al., "Multigigabit/s operations of 16-wavelength vertical-cavity surface-emitting laser array," IEEE Photonics Technology Letters, 3(10):863-865, (1991).
Mateus et al., "Ultrabroadband mirror using low-index cladded subwavelength grating," IEEE Photonics Technology Letters 16(2):518-520, (2004).
Matsui et al., "Chirp-Managed Directly Moduated Laser (CML)," IEEE Photonics Technology Letters, 18(2):385-387, (Jan. 15, 2006).
Mikailov et al., "High-Resolution Planar Dispersive Element Based on a Surface Polaritonic Crystal," CLEO/QELS 2006, QTuA6.pdf. (2 pages).
Moon et al., "Effective single-Mode Transmission at Wavelengths Shorter Than the Cutoff Wavelength of an Optical Fiber," IEEE Photonics Technology Letters, 17(12):2604-2606, (Dec. 2005).
Shirasaki, "Chromatic-Dispersion Compensator Using Virtually Imaged Phased Array," IEEE Photonics Technology Letters, 9(12):1598-1600, (Dec. 1997).
Schnitzer et al., "Biased and Bias-Free Multi-Gb/s Data Links Using GaAs VCSEL's and 1300-nm Single_mode Fiber," IEEE Photonics Technology Letters, 10(12):1781-1783, (Dec. 1998).
Wu et al., "Widely and Continuously Tunable Micromachined Resonant Cavity Detector with Wavelength Tracking," IEEE Photonics Technology Letters, 8(1):98-100, (Jan. 1996).
International Search Report and Written Opinion for co-pending international application No. PCT/US2014/043650 dated Oct. 15, 2014 (17 pages).
Office Action for corresponding Chinese application No. 201480050617.2 dated May 4, 2017.
Office Action for corresponding Chinese application No. 201480050617.2 dated Dec. 5, 2018.

* cited by examiner

FIG. 12

ADJUSTABLE GRID TRACKING TRANSMITTERS AND RECEIVERS

CROSS REFERENCE TO RELATED APPLICATIONS

This application is a continuation of copending U.S. patent Ser. No. 13/951,678 filed on Jul. 26, 2013 to Vail et al., entitled "Adjustable Grid Tracking Transmitters and Receivers," incorporated herein by reference.

FIELD OF THE INVENTION

The invention relates to optical telecommunication components that provide for adjustable optical connections to transducers through dispersive elements.

BACKGROUND OF THE INVENTION

As telecommunication bandwidths increase, there is a strong demand for low power consumption, low cost, high bandwidth transmitters and receivers. To increase bandwidths of optical transmissions between two points, wavelength division multiplexing (WDM) can be used in which information is carried on different channels, e.g., N channels, each at a unique wavelength. Adjacent points can be, for example, many kilometers away from each other. The channels can be arranged on a wavelength grid, e.g., with uniform spacing in wavelength or frequency, such that the spectral content in each channel does not interfere with adjacent channels. Also, an increase in bandwidth can be achieved using modulation at higher data rates. Generally, current technology involves WDM of 4 to 100 channels and data rates of 2.5 gigabits/second (G), 10 G, 25 G or 40 G, although it is expected that these values of channel number and modulation rates will evolve over time.

Nodes along a communication network can involve transmitters and or receivers to interface appropriately with the optical communication signals. Optical fibers with multiplexed optical signals generally are used to connect remote points on the network. If the optical channels are on a wavelength grid or frequency grid, the synchronization of the wavelengths can be expensive and can dissipate considerable power, e.g. to maintain temperature control. Precise control of device production and operating conditions is typically needed with communication systems involving narrowly spaced wavelength channels to align channel wavelengths with the narrow, passbands of multiplexors/demultiplexors.

SUMMARY OF THE INVENTION

In a first aspect, the invention pertains to an adjustable optical telecommunication transmitter comprising a plurality of light emitting elements that emit optical signals chromatically spaced from each other, a dispersive element and an adjustable beam steering element. The dispersive element comprises a dispersive structure, a first interface providing a plurality of optical channel paths being optically coupled to the plurality of light emitting elements and to the grating and a conjugate spatially-extended second interface to receive chromatically combined signals form the dispersive structure. The adjustable beam steering element optically can be connected to the first interface or to the conjugate spatially-extended second interface.

In a further aspect, the invention pertains to an adjustable optical telecommunication receiver comprising:
  an input line for coupling to a received optical signal;
  a dispersive element comprising a dispersive structure, a spatially-extended input interface for receiving undispersed optical signals at selectable locations along such interface with optical signals propagating to the dispersive structure and an optical output interface for coupling dispersed optical signals from the dispersive structure to other optical elements;
  a beam steering element; and
  a plurality of light receiving elements positioned to receive the dispersed optical signals from the output interface of the dispersive element, to generate electrical signals in response to the dispersed optical signals.
The beam steering element can comprise an actuator and a controller programmed to dynamically adjust the beam steering element based on the spectral content of the received optical signal or other topical parameters, to guide either the direction of a received optical signal from the input line to a specific location on the input interface of the planar dispersive element or the direction of dispersed optical signals from the output interface to the plurality of light receiving elements.

In other aspects, the invention pertains to an optical multiplexer/demultiplexer comprising a planar dispersive element having a grating, a first interface for conveying an undispersed optical signal through the interface into the grating and a second interface for coupling dispersed optical signals to other optical elements and a beam steering element having a first lens and an adjustable reflector with the first lens positioned between the adjustable reflector and the second interface of the planar dispersive element, in which the angle between the optical reflector and the second interface can be adjusted to redirect the dispersed optical signal.

In some aspects, the invention pertains to an adjustable, planar multiplexer/demultiplexer comprising a grating; a plurality of dispersed signal waveguides interfacing with the grating at a first interface; a spatially-extended second interface to receive chromatically combined signals from the grating; and a cantilevered beam steering element positioned to receive the chromatically combined signals from the spatially-extended second interface. The cantilevered beam steering element can comprise a steerable waveguide operably connected to a cantilever structure with electrodes to effectuate adjustment of the position of the steerable waveguide in response to an electrical signal.

In additional aspects, the invention pertains to a method for providing grid tracking for an optical transmitter or receiver, the method comprising: adjusting a beam steering element configured to receive chromatically combined signal from an optical transmitter or receiver to select a chromatic grid with a particular center band.

In another aspect, the invention pertains to a method for conveying multiple distinct data signals through an optical fiber, said method comprising:
  i) transmitting output from a plurality of lasers through a multiplexing device to form a spectrally combined optical signal, wherein the output of each laser corresponds to an independent data signal;
  ii) transmitting the spectrally-combined optical signal over an optical fiber; and
  iii) receiving the spectrally combined optical signal at a receiver comprising a dispersive element configured to disperse the combined optical signal into independent optical signals and a plurality of light receiving elements configured to receive the independent optical signals that generate an electrical signal in response to received light, wherein the multiplexing device, the receiver or both comprise a beam steering element, and wherein the beam steering element is automatically adjusted by a controller to maintain a signal intensity at the plurality of light receiving elements representative of the independent data signals.

DETAILED DESCRIPTION

An adjustable optical element, e.g., a tunable multiplexor/demultiplexor or a device incorporating a tunable multiplexor/demultiplexor, incorporates a dispersive element and a beam steering element to enable the tracking of wavelength division multiplexed communication signals. A tunable multiplexor/demultiplexor can be located at a junction between a transmitter or receiver, and an optical transmission waveguide/optical fiber. This enables the ability to provide for a shifted chromatic grid, which can result from thermal drift, chromatic consistency or other wavelength adjustment requested from the device. The adjustable device interfaced with the transmitter/receiver can maintain signal integrity on a precision wavelength grid with a beam steering element to direct signals from a dispersive element according to a spatial shift in the signal, e.g. resulting from temperature changes, such that the device can chromatically adapt over a useful range of wavelengths. The dispersive element can be configured to propagate optical signal, e.g., a chromatically combined or a chromatically dispersed signal, toward the beam steering element, and generally small angular redirection of the optical signal can account for spatial shifts of the optical signal from the dispersive element over an appropriate chromatic range. In some embodiments, the tunable feature of the multiplexor/demultiplexor can replace the use of temperature control, reduce insertion loss despite variation in manufacturing, and/or enable the efficient use of the optical spectrum by enabling a narrower wavelength grid.

The dispersive element maps signals at different wavelengths to different spatial positions, and the beam steering element allows the wavelengths associated with those spatial positions to be adjusted, enabling tracking of signals as their wavelengths change over a useful range. In many dispersive elements, the beam steering element can be placed to operate on either the dispersed or combined signal. Various suitable dispersive elements can be used, such as arrayed waveguide gratings (AWGs) or echelle gratings. Elements of the device generally can be free space optical elements, planar optical circuit elements or combinations thereof, and light sources or light receiving elements may or may not be solid state devices. The dispersive element generally comprises an input interface and an output interface the guide light signals to and from a dispersive structure. The described interfaces generally represent an area of location and/or direction with respect to the dispersive structure and may or may not be associated with a physical surface. For planar dispersive elements, the respective interfaces can be slab waveguides (which can be called star couplers, star waveguides or other names in the art) or similar optical path that is not laterally constrained along a confined path.

In some embodiments, a MEMs structure or other mechanical actuating structure in combination with a mirror or other reflective/redirecting element can provide a suitable beam steering element. Generally, small angular redirection of the optical signal can cover an appropriate wavelength range to provide the desired tunable feature. In general, the wavelengths corresponding to the solid state devices tend to shift similarly to each other in reaction to disturbances such that the wavelength spacing between them is maintained, i.e., tuning as a group to longer or shorter wavelengths, which allows a single adjustment to track multiple signals with a small angular redirection.

The combination of the dispersive element and beam steering element form a chromatically adjustable device connecting one or more waveguides independently on either end of the device with a dispersed signal on one end and a combined signal on the other end, with "end" referring to a conceptual and not necessarily a physical location. In some embodiments, the ability to adjust the dispersed signal to adjust for thermal changes provides the ability to reduce or eliminate a temperature controller otherwise required on an associated device, such as a thermoelectric cooler on a laser array. Furthermore, the ability to adjust for other contemporaneous parameters or fabrication parameters influencing the chromatic grid can similarly provide for cost and/or power savings in the device design and use.

The chromatically dispersed signal generally involves an independent optical signal corresponding to various data transmission at each wavelength. The data transmission can correspond to voice, video, documents, combinations thereof or other appropriate data signal(s). The transmission of combined optical signals provides for efficient resource use and reduction of hardware requirements for transmission of a particular volume of data. Transmitters convert data signals into corresponding optical signals, and receivers convert optical signals into corresponding electrical signals. A high bandwidth optical telecommunication system generally involves precise control to direct closely spaced optical wavelengths through multiplexing and/or de-multiplexing (De/MUX) operations to ensure that dispersive elements appropriately direct optical wavelengths to their intended locations. Incorporating such precise control can be expensive with respect to requiring careful temperature control and/or matching of optical elements to achieve desired function. As described herein, dynamic control can be introduced into the device, so that chromatic adjustment can be made dynamically to provide for good optical performance with a modest cost design and relatively low power consumption during use.

In an optical communication system, the combination of the dispersive element and beam steering element can form a part of a node of a point-to-point optical telecommunication system connecting one or more sources and/or detectors with respect to the dispersed signals and one or more waveguides/optical fibers with respect to the combined signal. Wavelengths can then float, i.e. be allowed to change, in some embodiments lowering the costs and power consumption by removing use of thermoelectric coolers for precise temperature control of associated components and/or by relaxing manufacturing tolerances for a particular wavelength grid. These components can be used in a chromatically floating, or "unlocked", high-bandwidth low-cost transmitter or receiver.

As described herein, control of the beam steering element can be dynamically adjusted to improve the optical signal integrity, generally with respect to received or transmitted intensity. Thus, to provide for the use of less expensive design and/or lower power operation without sacrificing performance, the optical grid, i.e., wavelength grid or frequency grid, interfacing with the dispersive element can be allowed to float with respect to spatial, e.g., channel, positioning relative to the light path or orientation interfacing with the dispersive element. Appropriate adjustment to compensate for the floating optical grid can be provided by adjustment of the beam steering element, which can involve very low power consumption, through the use of a MEMs or other low-power-consuming actuator. The dynamic adjustment of the beam steering element generally is based on a measurement of an optical signal or other contemporaneous parameter, such as temperature. In embodiments of particular interest, the dynamic adjustment generally is made to account for the floating grid based on a measurement associated with the device and not for a random or continuously swept adjustment. The dynamic adjustment can be performed with a suitable beam steering element.

Figure 1:
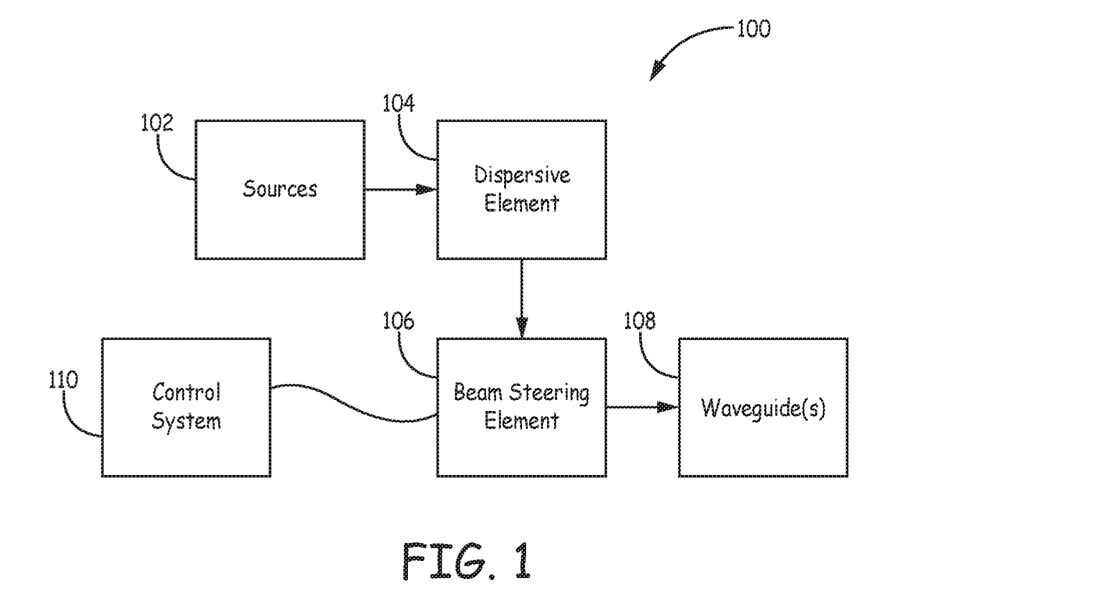
FIG. 1 is a schematic layout of a transmitter with adjustable grid tracking.

A schematic depiction of a dynamically adjustable transmitter is shown in FIG. 1. Transmitter 100 comprises an array of light sources 102, a dispersive element 104, beam steering element 106, conveying waveguide(s) 108 and control system 110. Flow arrows indicate the general direction of light transmission through transmitter 100. The array of light sources 102 generally can comprise an array of lasers, such as a collection of individual semiconductor lasers or a monolithic array of semiconductor lasers. Dispersive element 104 can conveniently be a planar optical structure, which can be a component of a planar optical circuit, although in some embodiments a free space grating can be used as a dispersive element. Beam steering element 106 can be a mirror, other reflector, deflectable waveguide or the like that can be physically deflected, for example, with the micro-electro-mechanical actuator (MEMs) or the like or other type of actuator. Beam steering element 106 can be conveniently provided as a free space element, but suitable planar optical beam steering elements are described below. Conveying waveguide(s) can be one or more waveguides that generally comprise and/or are coupled to optical fiber(s) that can be used to convey the optical signals to a remote location from the light sources. Control system 110 provides instructions for the adjustment of beam steering element 106 to provide the desired dynamic control of the transmitter.

Figure 2:
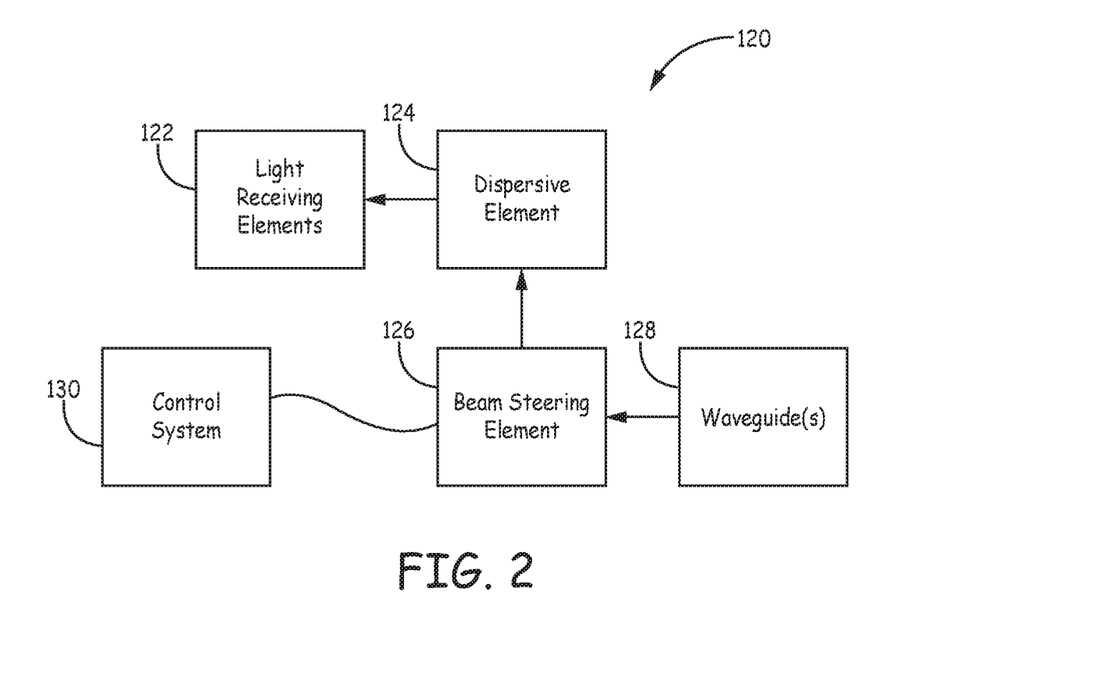
FIG. 2 is a schematic layout of a receiver with adjustable grid tracking.

A dynamically adjustable receiver is shown schematically in FIG. 2. Receiver 120 comprises light receiving elements 122, dispersive element 124, beam steering element 126, conveying waveguide(s) 128 and control system 130. Flow arrows again are used to indicate the general transmission of light through receiver 120. Light receiving elements 122 can be appropriate light sensors that measure light impinged onto the element and provide an electrical signal in response. Dispersive element 124, beam steering element 126 and conveying waveguide(s) 128 can be equivalent elements as dispersive element 104, beam steering element 106 and conveying waveguide(s) 108 described above with respect to transmitter 100 in FIG. 1. Control system 130 provides instructions for the adjustment of beam steering element 126 to provide the desired dynamic control of the receiver.

Dynamic control of the receiver provides desirable functionality to reduce cost and power consumption without reducing performance as noted below. A receiver with a beam steering element used to scan portions of a wavelength grid across a detector array is described in U.S. Pat. No. 7,952,695 to Crafts et al. (the Crafts patent), entitled "Scanning Spectrometer With Multiple Photodetectors," incorporated herein by reference. In contrast, the present devices have dynamic control rather than a scanning function, which introduces important distinctions with respect to application. Also, Crafts does not describe structures or methodology applicable to transmitters. Furthermore, specific embodiments herein can introduce other specific significant distinctions from the structures and/or functions suggested by the Crafts patent.

Figure 3:
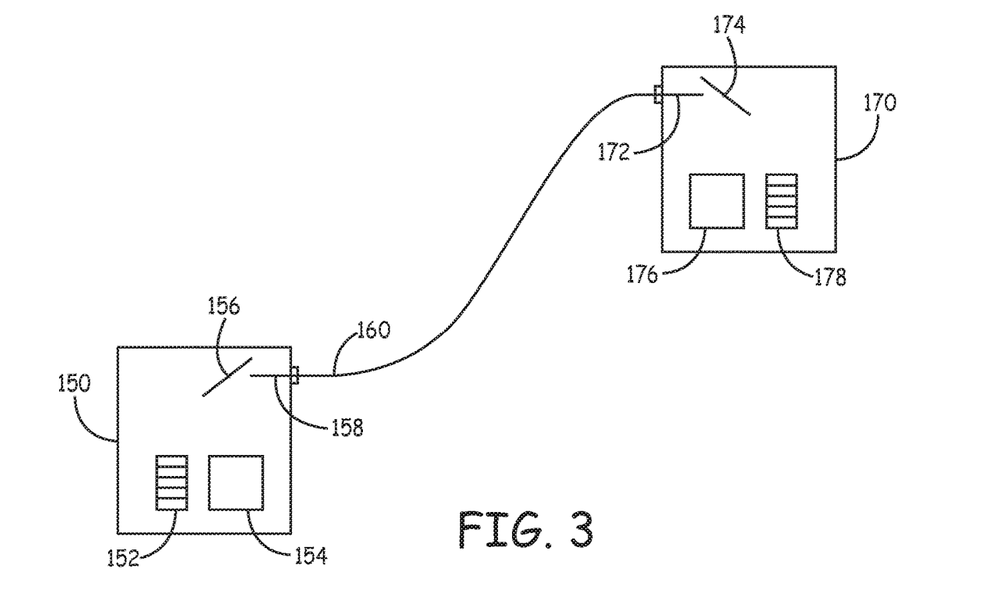
FIG. 3 is a schematic layout of a transmitter interfaced with a remote receiver within an optical telecommunication network, in which transmitter and receiver have adjustable grid tracking.

As noted above, the transmitters and/or receivers generally convey user data within a telecommunication network, which provides a further distinction from Crafts. A schematic view of a telecommunications link is shown in FIG. 3. Referring to FIG. 3, a transmitting location 150 comprises a plurality of transmitters 152, a dispersive element 154 that functions to multiplex the signals from the transmitters into a chromatically combined signal which is directed to a beam steering element 156 that directs the optical signal to a waveguide/optical fiber 158 that couples the signal to an optical fiber 160 that transmits the signal to a remote receiving location 170. Remote receiving location 170 has a waveguide/optical fiber 172, beam steering element 174, a dispersive element 176 that functions to de-multiplex the optical signal into separate channels and light receiving elements 178 that can provide electrical signals in response to the separate channels of optical signal. Control elements are not shown in the view to simplify the drawing. The distance between transmitting location 150 and receiving location 170 may or may not be large, such as on the kilometer scale. Locations 150, 170 can be nodes along a communication system to redirected signals for further transmission, or they can be end points of the communication system in which the de-multiplexed signals are intended for particular end users. In some embodiments, only one of the nodes, i.e., transmitting location 150 or receiving location 170 comprises an adjustable beam steering element, for example, if one of the locations is designed or controlled to avoid chromatic shifts. Also, a receiving location can comprise an adjustable beam steering element while the transmitting location does not comprise a beam steering element where the receiver tracks the transmitter, which can be particularly suitable if the multiplexor and sources shift at the same rate.

Some specific embodiments are discussed in detail below, but some general features of the basic components of the device are now summarized. Transmitters can comprise a plurality of sources that generally emit in different optical channels and are mounted in a specific physical arrangement to direct the respective optical signals for further processing. Sources generally are lasers, such as semiconductor lasers. In some embodiments, the sources can be an array of semiconductor lasers mounted on a single chip or the like. Generally, a transmitter comprises at least 4 sources, in other embodiments at least 10 sources, and in additional embodiments at least 16 sources, although it can be desirable to have a hundred or more sources.

Receivers comprise a plurality of light receiving elements that generate electrical signals in response to light and are physically arranged generally to receive light in different optical channels. In general, any suitable light receiving elements can be used discretely, diversely, and/or in integrated arrays, including elements such as p-i-n photodiodes, avalanche photodiodes, MSM photo-detectors, or complex optical receivers. In some embodiments, an array of solid state light receiving elements can be conveniently mounted on a chip. Generally, a receiver comprises at least 4 detectors, in other embodiments at least 10 detectors, and in additional embodiments at least 16 detectors, although it can be desirable to have a hundred or more distinct detectors. A person of ordinary skill in the art will recognize that additional ranges of source numbers and/or light receiving element numbers within the explicit ranges above are contemplated and are within the present disclosure.

In general, any suitable dispersive element can be used to De/MUX the optical signals, such as prisms, grating or the like. Suitable gratings can be arrayed waveguide gratings (AWGs), echelle gratings, Bragg gratings or the like. While some embodiments can effectively use free space dispersive elements, in some embodiments it is convenient to use dispersive elements assembled onto planar optical chips or the like. For example, a planar AWG is shown in an embodiment of FIG. 4, which is discussed further below, and other planar dispersive elements are also discussed. Planar dispersive elements in particular can provide for compact assembly into a device and a correspondingly smaller footprint, and passive planar devices can be efficiently produced to incorporate desirable planar dispersive elements.

Also, any reasonable beam steering element can be used, such as a mirror, a reflector grid, a deflectable waveguide or fiber or the like. The beam steering element can be a planar structure or a free space element, and there are trade offs with respect to the selection of a planar or free space element. Examples of both types are provided below. The steering aspect of the optical element can be provided by a mechanical element that reorients at least a portion of a reflecting or conveying optical element to redirect the optical path. Generally, a small reorientation accomplishes the desired redirection of the optical path. A small actuator can be desirable from power consumption, precision, device footprint, and other significant perspectives. Small mechanical actuators are generally referred to as micro-electro-mechanical or MEMs devices without reference to a particular design or structure.

Depending on the selected architecture, various planar waveguides and/or optical fibers can be used to connect elements, and some specific embodiments are described below to provide some examples. Connectors are known in the art to transition between planar waveguide based devices and optical transmission fibers. Longer distance optical fiber transmission lines can be used for point to point transmissions and connected to the devices at the particular node.

Figure 4:
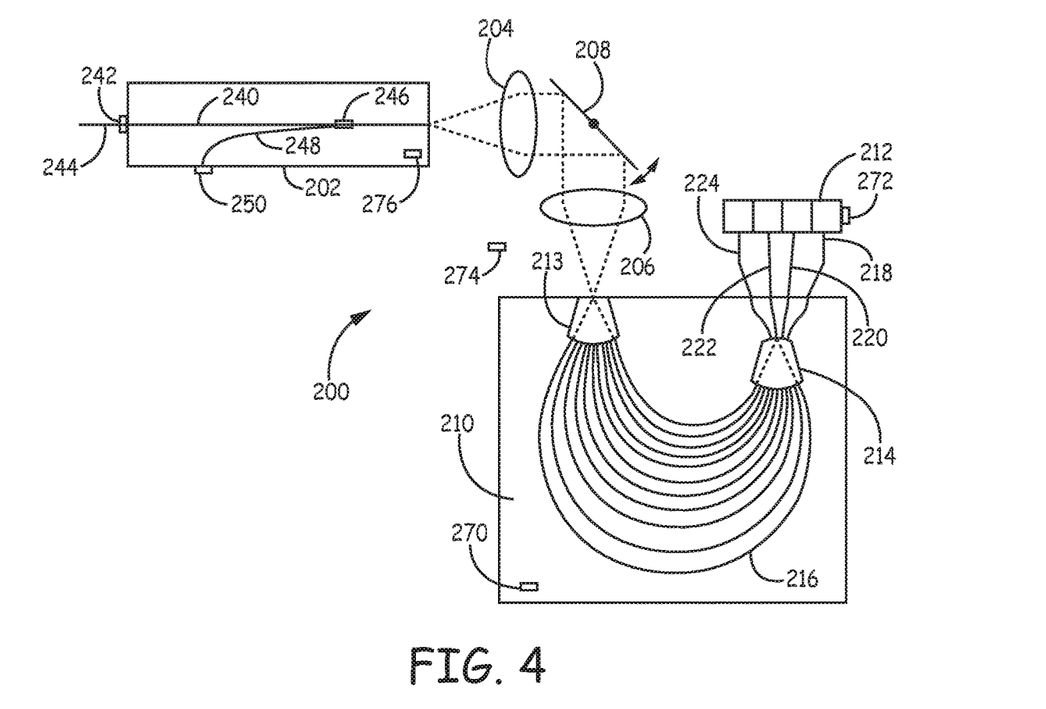
FIG. 4 is a top plan view of an embodiment of a transmitter or receiver with adjustable grid tracking.

A schematic view of an embodiment of an adjustable transmitter incorporating a planar arrayed waveguide grating (AWG) as a dispersive element is shown in FIG. 4. This design can be adapted for a receiver through the exchange of the light sources 212 with light receiving elements where the signal from the light receiving elements can be interpreted to guide the adjustment the beam steering element instead of the tap photoreceiver and the tap is generally not present. In this embodiment, transmitter 200 comprises a planar dispersing element and a free space beam steering element. Transmitter 200 comprises transmission waveguide 202, lenses 204, 206, micro-electro-mechanical systems (MEMs) adjustable mirror 208, AWG 210 and light sources 212. AWG 210 comprises first slab waveguide 213, second slab waveguide 214, an array grating waveguides 216 optically connecting first slab waveguide 213 and second slab waveguide 214 waveguides 218, 220, 222, 224, which are optically connected to second slab waveguide 214 to carry optically dispersed optical signals. Generally, AWG 210 is formed on a planar optical chip or a planar lightwave circuit (PLC), as described further below. First slab waveguide 213 is configured along the edge of the optical chip such that free space transmission interfaces with the first slab waveguide 213 in contrast with a more conventional structure with light directed into a planar waveguide guided in both directions. The design with the slab waveguide propagating into free space provides for adjustment of the propagation as redirected by the beam steering element. A temperature sensor can be incorporated into transmitter 200 at various locations. Four representative locations are shown in the figure as elements 270 (associated with planar structure 210), 272 (associated with light sources), 274 (within the housing (not shown)) and/or 276 (associated with planar structure 202). A plurality of thermal sensors can be incorporated into the system, if desired, in which the values can be averaged or separately accounted for the in the adjustment of the beam steering element. A temperature sensor can comprise a thermocouple, thermistor, resistance temperature detector (RTD) or other reasonable design.

The components of transmitter 200 are configured such that light from the light sources 212 are directed to waveguides 218, 220. 222. 224, which transmit the light to second slab waveguide 214, through array grating waveguides 216 and to first slab waveguide 213. A PLC can be connected to transmitter array using optical fibers and connectors, free space propagation or through direct attachment of the PLC to the surface of the transmitter array using an adhesive or the like. Direct connection of a PLC to a solid state receiver array is described in U.S. Pat. No. 7,272,273 to Yan et al., entitled "Photodetector Couple to a Planar Waveguide," incorporated herein by reference. Waveguide 218, 220, 222, 224 generally correspond in a one-to-one relationship with elements of the transmitter. As noted above, the number of transmitter elements can span noted ranges, and 4 elements are shown in FIG. 4 for convenience, but the number can be selected as desired within reasonable ranges. Some specific embodiments of transmitters are described in detail below.

An AWG may be made as a planar optical structure comprising a substrate, an underclad layer over a surface of the substrate and the AWG over the underclad layer, optionally with an overclad layer over the optically transmitting elements. AWG deigns are known in the art, and can be designed for the specific wavelength ranges and channel spacings. Design features for AWGs are described further in U.S. Pat. No. 6,697,552 to McGreer et al, entitled "Dendritic Taper for an Integrated Optical Wavelength Router," incorporated herein by reference. To improve optical coupling of chromatically dispersed optical signals, second slab waveguide 214 can incorporate, for example, the dendritic structure described in the '552 patent above or with an optical coupler structure as described copending U.S. patent application Ser. No. 13/679,669 to Chen et al., entitled "Wavefront Division Optical Coupler," incorporated herein by reference.

To achieve a small device footprint and a low cost, the MEMs structure can be conveniently used to adjust the mirror angle. One design of a MEMs structure for mirror adjustment is described in U.S. Pat. No. 7,016,594 to Godil et al, entitled "Heat Actuated Steering Mount for Maintaining Frequency Alignment in Wavelength Selective Components for Optical Communication," incorporated herein by reference. Voltage controlled MEMs based mirrors are available commercially from NeoPhotonics Corporation. MEMs devices can operate with sub-milliwatt power consumption.

With the use of a free space beam steering device, it can be desirable to incorporate one or more lenses or the like to control the light signal. As shown in FIG. 4, lenses 204, 206 are used to focus the free space optical signal. In particular, lens 206 focuses the optical signals reflected from adjustable mirror 208 toward transmission waveguide 202 to decrease loss of optical signal with respect to propagation of the signal in transmission waveguide 202. Lens 204 can diminish the effects of beam spreading of the optical beam when the beam propagates through free space. Appropriately selected lenses or the like can be used and positioned to decrease dissipation of the optical signal. In some embodiments, adjustable mirror 208 can be positioned roughly at one focal length behind lens 206 to reduce optical loss.

Transmission waveguide 202 can be a planar structure or an optical coupler connected to an optical fiber. If transmission waveguide 202 is a planar structure, the waveguide can comprise an optical core 240 to propagate light to a coupling element 242 to transfer the optical signal to an optical fiber 244 for longer range transmission. Also, a tap 246 can be connected to optical core 240 to direct a small portion of the optical signal intensity along tap core 248, which directs the tapped signal to receiver/power meter 250. A reading at receiver/power meter 250 can be used to adjust beam steering element 208, for example, to increase the optical signal.

In use, light sources 212 as well as AWG 210 can be subjected to temperature changes that can cause center wavelength drift of the optical signal. For example, a light source comprising indium phosphide based semiconductor laser can exhibit a center wavelength drift rate on the order of 0.12 nm/° C. A silica based AWG can exhibit a wavelength drift on the order of 0.01 nm/° C. Over typical operating temperature ranges of −5° C. to 75° C., the overall change in wavelength can be approximately 9 nm, resulting in a power loss of greater than 30 dB for wavelengths distributed on a typical grid spacing of 4.5 nm. To help compensate for the wavelength drift, MEMs adjustable mirror 188 can be pivoted to shift the center wavelength to compensate for the shift. Control of adjustable mirror 188 is described further below.

Other dispersive elements can be used as noted above. Free space dispersive elements can include gratings, which can be transmissive (slits) or reflective (spaced apart reflective elements) in design. Suitable gratings include Bragg gratings and echelle gratings. Echelle gratings can achieve a compact configuration with a good dispersion through use at an angle to the incident light. While higher order dispersions can overlap in the dispersed light from echelle gratings, for optical telecommunication bands, the range of channels are generally well dispersed with an echelle grating without necessarily first initially dispersing the spectrum with another grating with a higher slit density and approximately normal incidence.

Figure 5A:
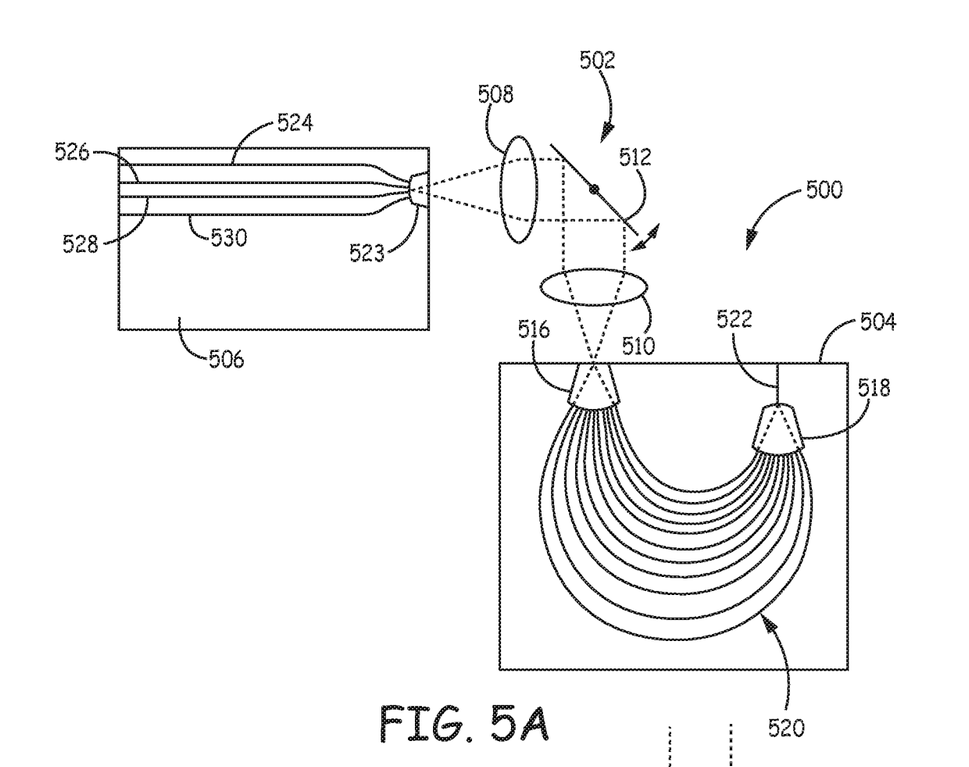
FIG. 5A is a top plan view of a De/Mux device with adjustable grid tracking in which the adjustable mirror redirects a chromatically dispersed signal.
Figure 5B:
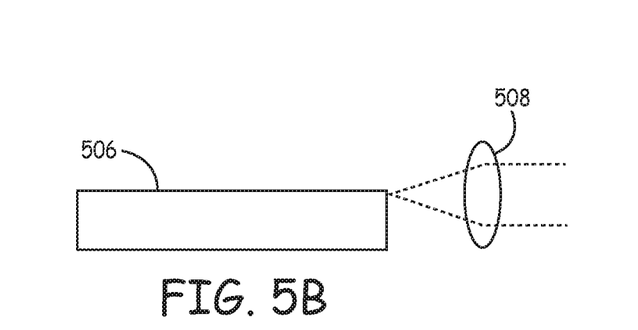
FIG. 5B is a side view of the De/Mux device of FIG. 5A viewed along line B.
Figure 5C:
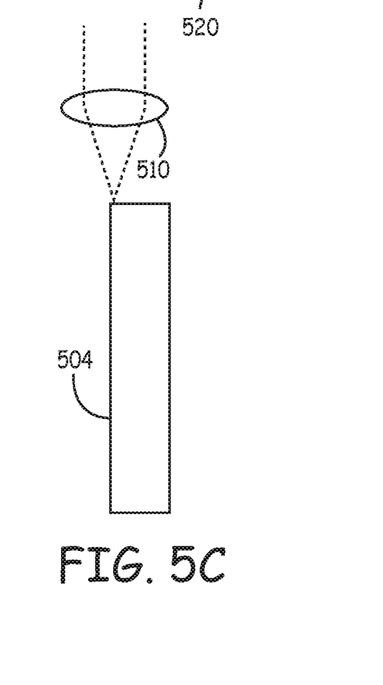
FIG. 5C is a side view of the De/Mux device of FIG. 5A viewed along line C.

FIG. 5A shows an embodiment of a tunable De/Mux device for incorporation into a receiver/transmitter. De/MUX device 500 comprises beam steering device 502, AWG 504 and waveguide structure 506. In this embodiment, beam steering device 502 is disposed to receive a chromatically dispersed signal from AWG 504, in contrast with the embodiment depicted in FIG. 4 in which the beam steering element receives a chromatically combined signal from the dispersive element. Beam steering device 502 comprises lenses 508, 510, and adjustable mirror 512. The focus of the respective lenses 508, 510 is shown in side views in FIGS. 5B and 5C, which shows positioning to use astigmatism. Adjustable mirror 512 can be coupled to a controller to pivot or otherwise adjust adjustable mirror 512, for example, to adjust in response to a particular measurement.

AWG 504 comprises slab waveguides 516, 518 interfaced with an array of diffraction waveguides 520 and waveguide 522 for the combined optical signal interfaced with slab waveguide 518. Slab waveguide 516 is positioned to terminate at the edge of the planar device such that light leaving the slab waveguide propagates into free space toward beam steering element 502. Slab waveguide 518 couples into waveguide 522 for propagating the chromatically combined optical signal. Waveguide 522 generally is coupled to an optical fiber for longer range transmission of the chromatically combined signal.

Waveguide structure 506 is shown as a planar optical device with a slab waveguide 522 positioned along the edge of the waveguide structure 506. Slab waveguide 522 optically couples with waveguides, 524, 526, 528, 530, which are positioned to transport chromatically dispersed signals generally with one channel per waveguide. Thus, the number of waveguides can be designed according to the number of channels. Waveguides 524, 526, 528, 530 generally each interface with either an individual light source for a transmitter or an individual light receiving element for a receiver. In a receiver, these waveguides can be made multi-mode to widen the wavelength bandwidth of the received light. This can be particularly useful when there is variation in the wavelength spacing between channels that cannot be removed by the tracking function. Multimode waveguides and their use are described further in Amersfoort et al., Electronics Letters 30 (4), pp. 300-302 (February 1994), incorporated herein by reference.

As discussed above with reference to FIG. 4, the pass band of AWG 520 can be dependent on the operating temperature and/or other properties of light, such as polarization state. By incorporating a controller coupled to adjustable mirror 512, light from waveguides 524-530 can be monitored to detect changes in the center wavelengths of the corresponding data signals and adjustable mirror 512 can be automatically pivoted accordingly, to focus desired wavelength ranges on output ports 524-530 and diffraction waveguides 520. Thus, adjustable mirror 512 can be automatically pivoted to tune the wavelengths directed at coupler 516 and waveguides 524, 526, 528, 530 of waveguide device 506 and coupler 522 and diffraction waveguides 520 of AWG 504. Control of the adjustable mirror is described further below in the context of a suitable controller. In some embodiments, it can be desirable for adjustable mirror 512 to be located approximately one focal length from lens 510. Lens 508 of beam steering element 502 is positioned between adjustable mirror 512 and waveguide structure 506. Similarly, lens 510 is positioned between slab waveguide 516 of AWG 504 and mirror 512. For steering of the chromatically dispersed signal the focusing of the free space propagation can be desirable to reduce signal loss. A shown in FIG. 5, lens 510 can be positioned to image the vertical direction for one facet to the other facet as guided by the free space optics. In a sense, the slab waveguide is conceptually divided with the free space optics connecting the sections of slab waveguide to allow a curved focal plane to reduce optical loss.

Figure 6:
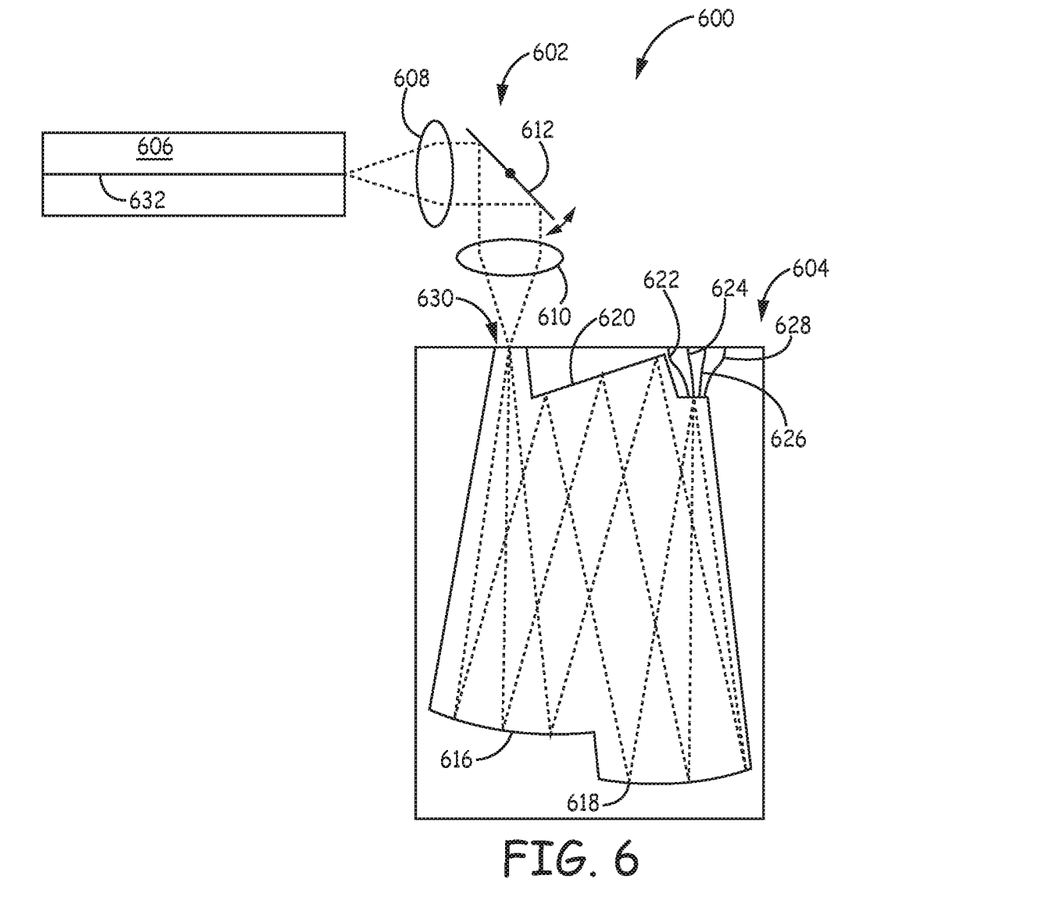
FIG. 6 is a top plan view of a De/Mux with grid tracking based upon a planar echelle grating.

Another embodiment of an adjustable De/MUX device for integration into a transmitter/receiver based upon an echelle diffraction grating is shown in FIG. 6. De/MUX device 600 comprises beam steering device 602 disposed in the light path between planar diffraction element 604 and waveguide 606. The device depicted in FIG. 6 is similar to the corresponding components of the transmitter device in FIG. 4 with the replacement of AWG 210 with a planar echelle grating based dispersive element. Referring to FIG. 6, beam steering device 602 comprises lenses 608, 610, and adjustable mirror 612, which is analogous with adjustable mirror 208, and can be similarly adjusted through pivoting of the mirror. Planar dispersive element 604 comprises planar reflectors 616, 618 and echelle grating 620 positioned to form the light path shown in the figures between waveguides 622, 624, 626, 628 and edge 630. The optical path through planar dispersive element 604 is located along a generally laterally unconfined core layer except for constrained waveguides 622, 624, 626, 628. Reflectors 616, 618 can be formed with a metal or dielectric coating or by utilizing total-internal-reflection. One or more of waveguides 622, 624, 626, 628 can have a bend (e.g. an s-bend) to position the waveguides along the edge of the planar structure in a more spaced configuration to facilitate connection to optical fiber or other optical element. Reflectors 616, 618 can have a concave reflecting surface to focus light reflecting from the elements, which can counter spreading of the beam during transmission through the planar element. The relative orientation of the surface of the diffraction grating can be selected such that a selected diffraction order is scattered along the optical path between reflectors 616, 618. A free space echelle grating for Multiplexing/Demultiplexing is described U.S. Pat. No. 6,647,182 to Sappey et al. (the '182 patent), entitled "Echelle Grating Dense Wavelength Division Multiplexer/Demultiplexer," incorporated herein by reference, and such a grating can be adapted for the current devices as a free space grating or for the design of a planar grating as described with respect to FIG. 6.

As described above, adjustable mirror 612 can be automatically pivoted to tune the wavelengths directed at interface 630 and waveguide 632 of waveguide device 606. Pivoting of adjustable mirror 612 can focus desired wavelengths to tune the wavelength grid of echelle grating 604 in response to detected changes in center wavelength in one or more of waveguides 622-628.

Figure 7A:
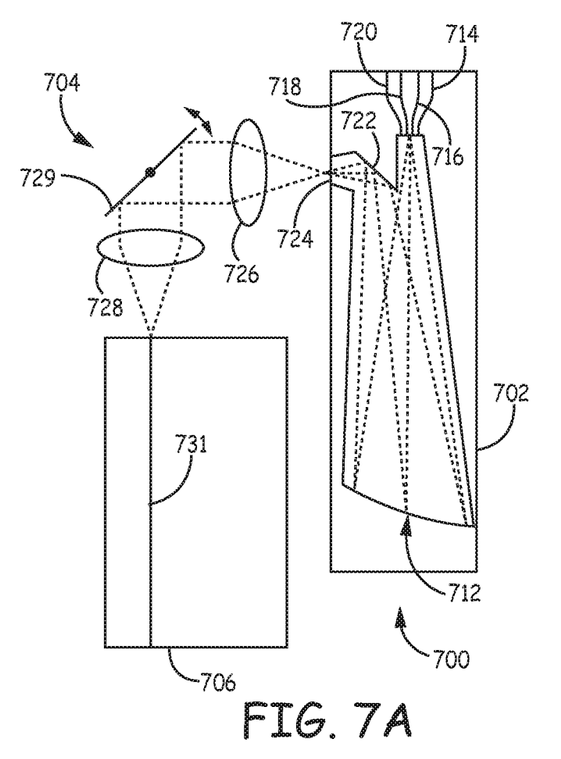
FIG. 7A is a top plan view of an alternative De/Mux device based upon a planar echelle grating.
Figure 7B:
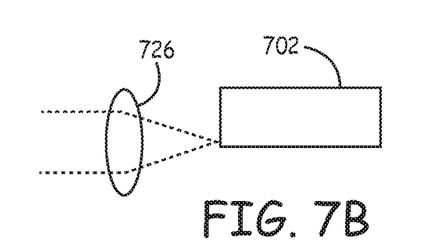
FIG. 7B is a side view of the dispersive element of the De/MUX device of FIG. 7A.
Figure 7C:
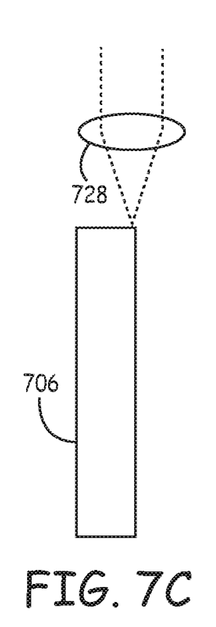
FIG. 7C is a side view of the planar waveguide structure of the De/MUX device of FIG. 7A.

In some embodiments, an echelle grating-based tunable De/MUX device can be made more physically compact by designing a planar refractive element comprising a curved grating that can simultaneously focus and disperse the optical signal. FIG. 7A shows an embodiment of a planar dispersive element with a curved grating. The De/MUX device of FIG. 7A is similar to the De/MUX elements shown in FIG. 4 with the AWG replaced by the planar dispersive element based on the curved grating. De/MUX device 700 comprises planar dispersive element 702, beam steering element 704 and transmission waveguide 706. Dispersive element 702 comprises curved grating 712 disposed between waveguides 714, 716, 718, 720, reflector 722 and interface 724. A side view of dispersive element 702 is shown in FIG. 7B. Curved grating 712 comprises a reflective, curved grating with a design of an echelle grating. The '182 patent describes a free space curved echelle grating for corresponding use as a free space element. Beam steering device 704 comprises lenses 726, 728, and adjustable mirror 729. The focus of the respective lenses 726, 728 is shown in side views in FIGS. 7B and 7C. Transmission waveguide 706 is a planar structure that comprises optical core 731. Optical core 731 can be connected to a tap as shown in FIG. 4 for transmission waveguide 202.

Planar dispersive element 702 is advantageous in that the combined reflector/grating allows for a more compact device. However, because the focusing element and echelle grating are combined, the blaze (i.e. the selection wavelength range placed onto target locations along the optical path) and angle of incidence of light at interface 724 and waveguides 714-720 cannot be simultaneously adjusted because of loss of optical degrees of freedom due to combination of the focusing element and echelle grating. Both practical constraints in design of optical transmission along interface 724 and corresponding focusing at the interface can introduce some optical loss. However, increasing the distance between the focal point at interface 724 and the focal point at waveguides 714-720 can reduce the optical loss.

Figure 8:
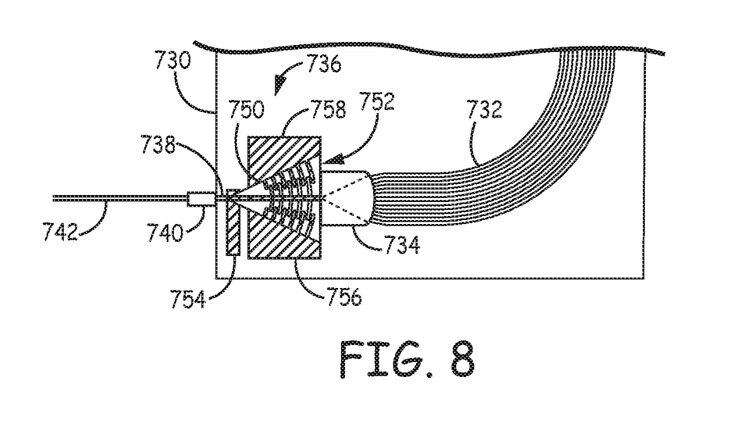
FIG. 8 is a top plan fragmentary view of a planar beam steering element integrated into a planar structure incorporating an AWG.

As noted above, the beam steering component can be a planar optical component rather than a free space component. An embodiment of a beam steering element integrated into the planar structure also comprising an AWG is shown in FIG. 8 in a fragmentary view of the entire planar component. Referring to FIG. 8, planar structure 730 comprises an array of waveguides 732, a slab waveguide 734 adjacent planar beam steering element 736, waveguide 738, connector 740 and optical fiber 742. Planar beam steering element 736 comprises a cantilevered waveguide 750, a comb drive 752 and electrodes 754, 756, 758. Comb drive 752 provides for the flexing of the cantilevered waveguide one way or the other through the application of voltage to waveguide electrode 754 and one or the other of the edge electrodes 756, 758. Electrodes can be formed by deposited metal, for example, on the sidewalls and top by sputtering or other suitable deposition approach. The shaded portions of the comb drive are generally etched downward, and undercutting can release the cantilevered waveguide and comb drive components. The comb drive operates to move the waveguide through electrostatic actuation. A design of a planar cantilever based element interfaced with waveguides to form a switch is described in U.S. Pat. No. 5,078,514 to Valette et al., entitled "Switch and System for Switching Integrated Optical Multichannels and Switch Production Method," incorporated herein by reference. The formation of a comb drive for an optical switch is described in detail in U.S. Pat. No. 7,709,354 to Stowe et al., entitled Optical Steering Element and Method," incorporated herein by reference, and the processing can be adapted for the comb drive configuration shown in FIG. 8.

As noted in the context of FIGS. 1 and 2, a control system is used to adjust the adjustable mirror based on a contemporaneous measured parameter. The control system can comprise any suitable hardware devices, such as an analog to digital converter to interface with a sensor, a processor such as a dedicated integrated circuit and/or a general purpose microprocessor programmed for control of the MEMs device for adjustment of the beam steering element, a digital to analog converter to send a signal to the MEMs device, appropriate one or more amplifiers, wire or wireless communication lines or the like. Adjustment of pivoting mirrors with a MEMs structure in an optical telecommunications device is described further in U.S. Pat. No. 6,914,916 to Pezeshki et al., entitled "Tunable Controlled Laser Array," incorporated herein by reference.

For a receiver, the measurements on one or more of the light receiving elements can be correlated with the beam steering adjustment to get a greater measured signal, for example. Thus, a feedback loop can be used for example periodically, such as every minute or every hour, to adjust the mirror to increase received signal. For a transmitter, a tap can be used, such as shown in FIG. 4, to measure the output from the transmitter to provide a parameter to provide for adjustment of the adjustable mirror to maintain a desired high output. For example, drifting of signal wavelengths can occur with age, and the adjustable mirror can be used to compensate for changes with age.

In some embodiments, the adjustment can be performed to adjust for temperature fluctuations. Temperature fluctuations can influence the performance of light sources, such as lasers, and dispersing elements, such as AWGs or other gratings. The changes induced by a temperature change can be adjusted by the direct measurements of the optical signals as described in the previous paragraph. In additional or alternative embodiments, a temperature sensor can be used, as shown in FIG. 4. Based on either design parameters or measurements of device performance measured for the device at known temperatures, an algorithm or a lookup table can be generated and used to correlate appropriate mirror adjustment based on temperature measured with one or more temperature sensors.

AWGs have been previously designed with passive temperature adjustment capabilities. Desirable embodiments of temperature compensating AWGs are found in published U.S. patent application 2012/0308176 to McGinnis, entitled "Thermally Compensated Arrayed Waveguide Grating Assemblies," incorporated herein by reference. The present approach to thermal compensation provides greater flexibility with respect to the previous approaches with respect to temperature compensation. In particular, the present approaches can provide for thermal changes in additional components of the system in addition to the dispersive elements, for additional changes to the operation of the device over time, other environmental changes and for design changes for the integration of the device into a telecommunication system. Thus, the current design can provide significant desirable functionality in comparison with the already useful designs in the McGinnis reference above.

Figure 9:
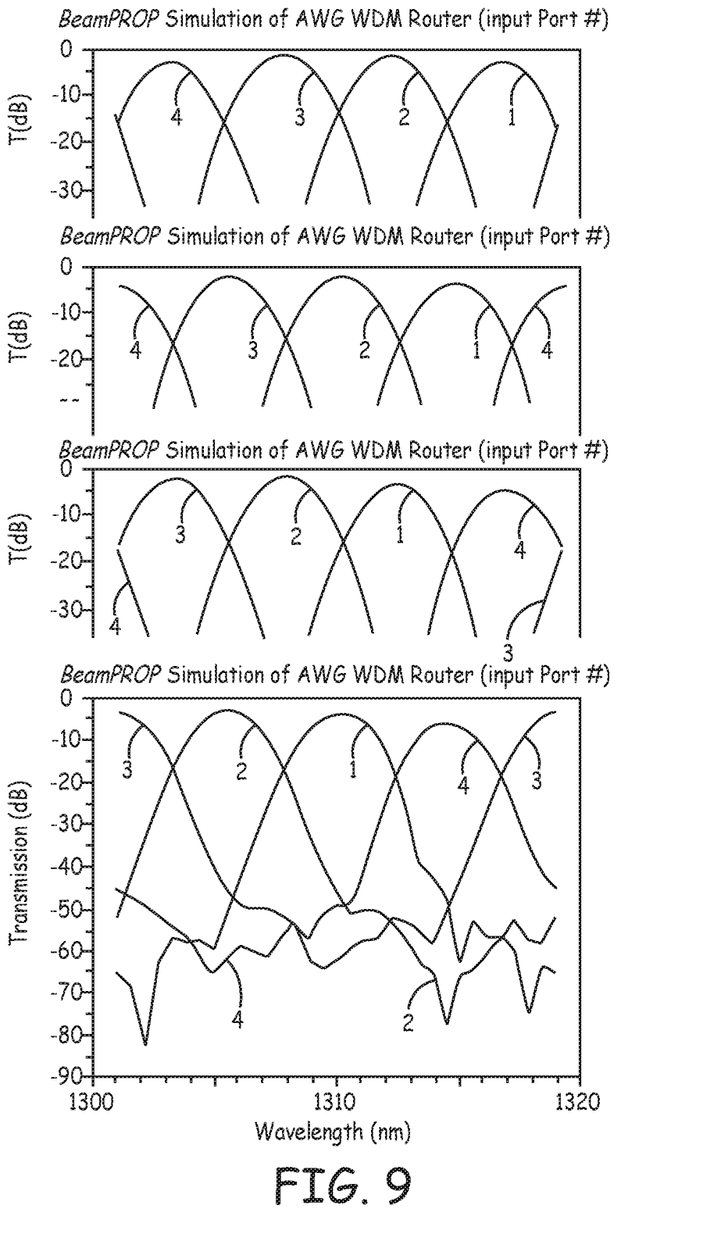
FIG. 9 is a set of plots of measured output from four source channels (1-4) as a function of wavelength and angle of beam steering element with lower panels of plots corresponding to slight rotations of the adjustable mirror with a corresponding shift in the wavelength transmission.

Due to the tunability of chromatically dispersed light from the dispersive element, the De/MUX apparatuses described herein support closer spacing of uncontrolled wavelengths and can provide for more data channels in the same wavelength span relative to alternative De/MUX apparatuses. To predict the improved bandwidth, simulations of a transmitter as shown in FIG. 4 were performed using the commercially available BeamPROP™ software (Synopsis, Inc.; Mountain View, Calif.). AWG 210 was simulated as a silica based AWG having a 1310 nm centered LR4 grid with a spacing of 4.5 nm. The effect of the MEMs based beam steering component was simulated by spatially displacing the input waveguide launch of first slab waveguide 212 and plotting the output spectrum for the four light sources 218-224. FIG. 9 is a composite of graphs showing the simulated power output versus simulated frequency of light sources 218-224 as adjustable mirror 208 is rotated. The top panel corresponds to a center wavelength launch and successively lower panels correspond to off-center wavelength launches, with increasing rotation angle of adjustable mirror 208. As shown in 9, drift in the center wavelength of the data channels (1-4) can be tracked by measuring the output power in output channels associated with waveguides 218-224. Since many effects can cause the grid wavelength to shift while the grid spacing remains relatively constant, using total power coupled to the waveguide can be an effective signal to use to adjust the adjustable mirror. While the simulation has been described in the context of a transmitter with the dispersive element operating as a multiplexer, however, the simulation results also predict the chromatic dispersing performance since the relevant portions of the apparatus are symmetric.

Figure 10:
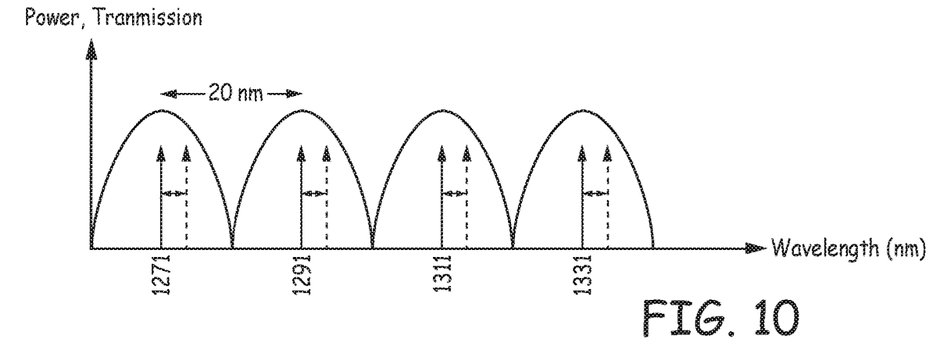
FIG. 10 is a plot of transmission power as a function of wavelength for a band of four independent optical signals spaced apart by 20 nm.

As a specific example of a wavelength grid that can take advantage of the tracking adjustable devices described herein, FIG. 10 shows an example of a standard colorless grid used in IEEE802.3ba 40GBASE-LR-4 standard. Transmission is shown with parabolic curves. The channel spacing is fairly large, 20 nm, since typically the multiplexor and demultiplexor wavelengths shift approximately 10 times less than the laser wavelengths. As temperature changes correspondingly change the laser wavelengths, shown by solid vertical lines at room temperature, shift as represented by dashed vertical lines, which are generally at longer wavelengths for increasing temperatures. A corresponding shift to shorter wavelengths would take place for decreasing temperatures. In order to keep the transmission high and cross talk between the channels low, the channel spacing is set to be fairly large, 20 nm.

Figure 11:
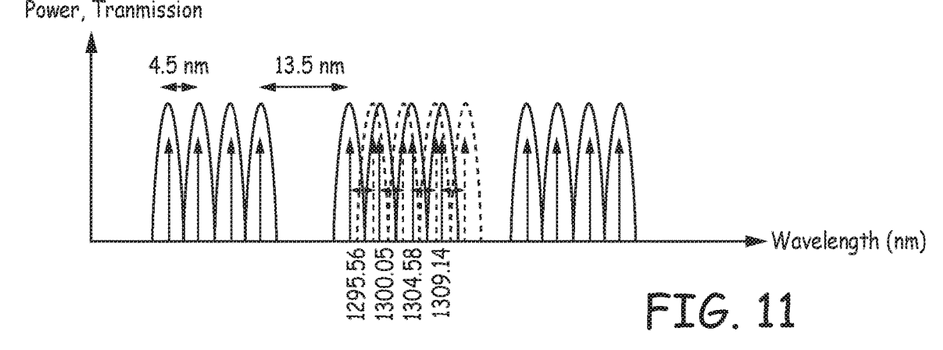
FIG. 11 is a plot of transmission power as a function of wavelength for three bands of four independent optical signals each in which the independent optical signals are spaced apart by 4.5 nm and the bands are spaced apart by 13.5 nm.

In contrast, FIG. 11 show how density can be increased when tracking multiplexors and de-multiplexors are used as described herein. Thus, a grid of 4.5 nm can be used based on transceiver components similar to standard IEEE802.3ba 100GBASE-LR4 components, with essentially the same device design parameters other than the tracking function. Since all of the wavelengths for each transmitter or receiver section go up and down approximately together, it is possible for the channel spacing to be reduced while maintaining good transmission and low cross talk between adjacent channels. Filter passbands shift with incoming signals to maintain good optical performance. It can be seen from FIGS. 10 and 11 that it can be possible to fit 3 independent bands of 4 channels in the same spectrum that have fit only 1 band before, even if each band was separated by a 13.5 nm guard band and allowed to independently shift in wavelength. Transceivers for operation based on the IEEE standards for 40 Gb/s and 100 Gb/s operation are described generally in Cole et al., "Photonic Integration for High-Volume, Low-Cost Applications," IEEE Communications Magazine, S16-S22, March 2009, incorporated herein by reference.

Additionally, a tracking receiver can be used with the 20-nm spaced transmitters based on the IEEE802.3ba 100GBASE-LR4 standard or with a floating transmitter proposed here, reducing the number of receiver types that would need to be provided. If a cyclic AWG was used in the tracking receiver, then the same part can be used for the additional bands at other wavelengths proposed in FIG. 11. The function of an AWG as a cyclic multiplexer is described in Dragone et al., "Integrated Optics N× N Multiplexer on Silicon," IEEE Photonics technology Letters 3(10), 896-899 (October 1991), incorporated herein by reference.

The materials for forming the PLC can be deposited on a substrate using CVD, variations thereof, flame hydrolysis or other appropriate deposition approach. Suitable substrates include, for example, materials with appropriate tolerance of higher processing temperatures, such as silicon, ceramics, such as silica or alumina, or the like. In some embodiments, suitable silicon dioxide precursors can be introduced, and a silica glass can be doped to provide a desired index of refraction and processing properties. The patterning can be performed with photolithography or other suitable patterning technique. For example, the formation of a silica glass doped with Ge, P and B based on plasma enhanced CVD (PECVD) for use as a top cladding layer for a PLC is described in U.S. Pat. No. 7,160,746 to Zhong et al., entitled "GEBPSG Top Clad for a Planar Lightwave Circuit," incorporated herein by reference. Similarly, the formation of a core for the optical planar waveguides is described, for example, in U.S. Pat. No. 6,615,615 to Zhong et al., entitled "GEPSG Core for a Planar Lightwave Circuit," incorporated herein by reference. The parameters for formation of an appropriate waveguide array are known in the art.

Figure 12:
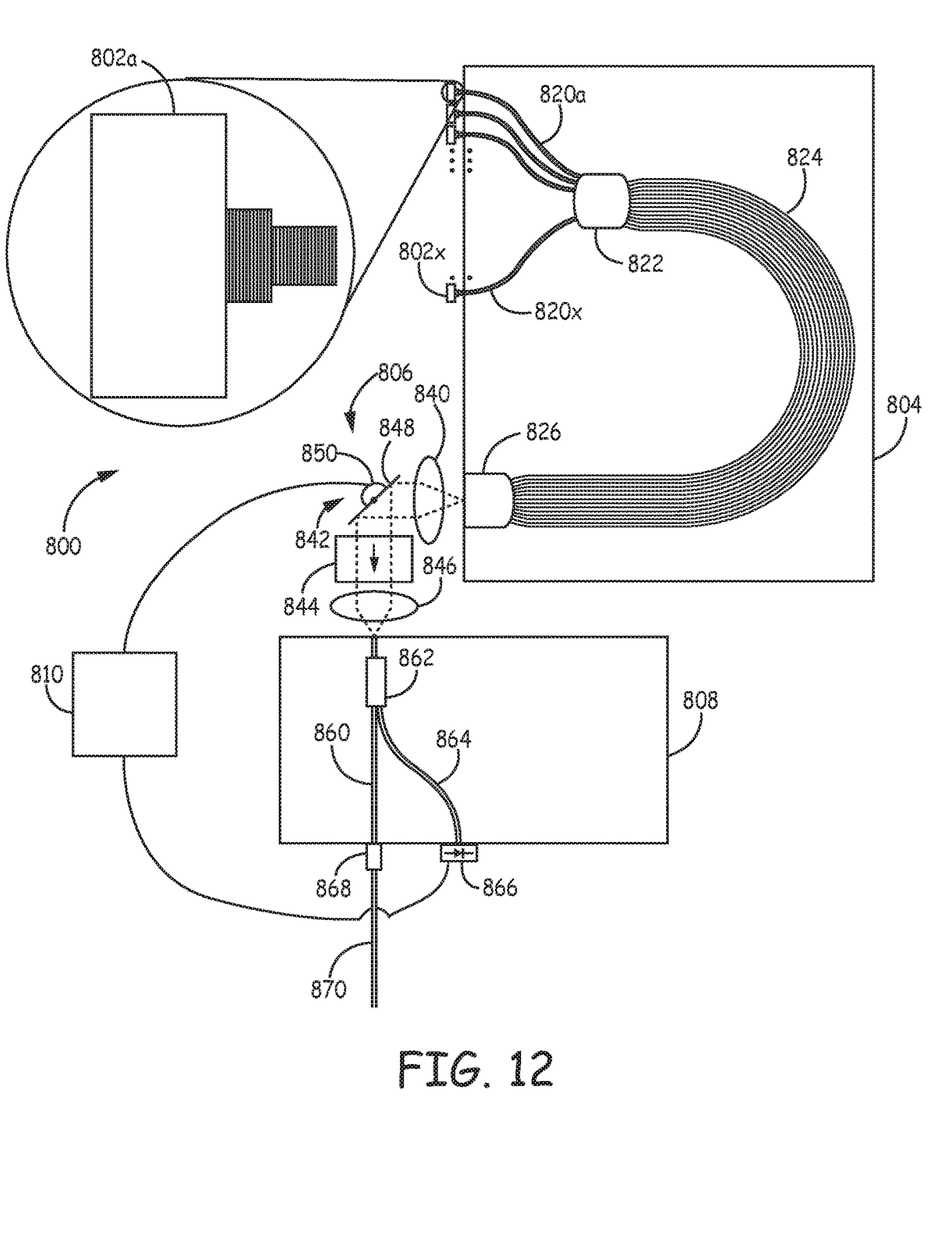
FIG. 12 is a top plan view of an embodiment of a transmitter based on an array of VCSEL light sources, a planar AWG and a free space beam steering element.

A specific embodiment of a transmitter incorporating the tuning function described herein is shown in FIG. 12. Transmitter 800 comprises an array of VCSEL (vertical cavity surface emitting laser) sources 802, planar dispersive element 804, beam steering element 806, planar light connector 808 and control system 810. Array of VCSEL sources 802 comprises 810$a$ to 810$x$, where x is the number of VCSEL lasers. The VCSELs can provide a low power consumption source that is suitable for telecommunications operation.

In some embodiments, the VCSEL are selected to be at periodic or spaced apart wavelengths on a grid. A multi-wavelength VCSEL array can be made by introducing growth non-uniformly, for example, directly or with selective area growth, which allows multiple arrays to be manufactured on each wafer. Direct formation of suitable VCSEL arrays is described in Chang-Hasnain et al., IEEE Journal of Quantum Elect., V.27, No. 6, p 1368 (1991) and Maeda et al., IEEE Photonics Technology Letters, V.3, No. 10 p, 863 (1991), both of which are incorporated herein by reference. In additional or alternative embodiments, VCSEL arrays can be used based on high contrast gratings, as described in Mateus et al., IEEE Photonics Technology Letters, Vol., 16, No. 2, pp 518-520 (2004), incorporated herein by reference.

Planar dispersive element 804 comprises a planar lightwave circuit (PLC) with waveguides 820$a$-820$x$, first slab waveguide 822, waveguide array 824 and second slab waveguide 826. Planar dispersive element 804 combines the VCSEL wavelengths into one fiber. VCSEL are mounted along the edge of planar dispersive element 804 with a VCSEL element aligned with a corresponding waveguide 820. Waveguides 820 transport light to first slab waveguide 822 at one end of waveguide array 824. Second slab waveguide 826 is at the other end of waveguide array 824 from first slab waveguide 822 and located at an edge of the PLC such that light from second slab waveguide 826 propagates into free space.

Beam steering element 806 comprises first lens 840, adjustable mirror 842, optical isolator 844 and second lens 846. First lens 842 is located about 1 focal length from planar dispersive element 804. Adjustable mirror 842 comprises mirror element 848 and mirror actuator 850. Mirror element 848 is positioned to reflect light from first lens 840 to optical isolator 844, which inhibits reflection of light back toward the VCSEL. Lens 846 receives light from optical isolator 844 and is positioned about a focal length from planar light connector 808.

Planar light connector 808 comprises transmission waveguide 860, tap connector 862, tap waveguide 864, receiver/light meter 866 and optical fiber connector 868. As shown in FIG. 10, optical fiber 870 is connected to optical fiber connector 868. Receiver/light meter 866 is connected to control system 810 through a wired or wireless connection to send a signal related to the amount of light received at receiver/light meter 866. Control system 810 is also connected to mirror actuator 860. Control system 810 can be programmed to adjust mirror actuator 860 to maintain a high light intensity at receiver/light meter 866 indicating a desired high light intensity in optical fiber 870. Adjustment of mirror 848 can compensate for drop in light intensity due to temperature changes, aging of the system or other fluctuating parameter influencing the light transmission.

Figure 13:
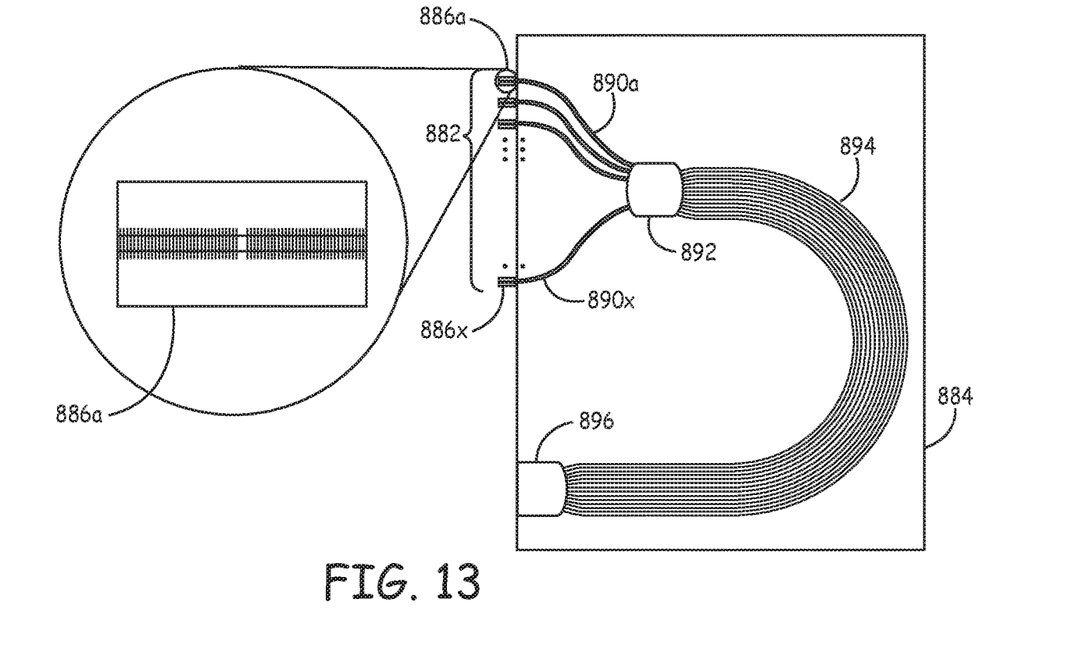
FIG. 13 is a top plan view of a planar AWG with an array of DFB lasers mounted along an edge of the planar AWG to provide optical signals into a corresponding set of planar waveguides directing the optical signals into a slab waveguide of the AWG.

A similar structure can be correspondingly assembled using an array distributed feedback (DFB) lasers as a substitute for VCSEL lasers. Arrays of DFB lasers for optical telecommunication operation are described further in U.S. Pat. No. 6,914,916 to Pezeshki et al., Entitled "Tunable Controlled Laser Array," incorporated herein by reference. An array of DFB lasers can be mounted along an edge of a dispersive element, as shown in FIG. 13, to replace the array of VCSEL sources 802 and planar dispersive element 804 of FIG. 12. DFB laser arrays can be monolithically integrated onto a single semiconductor chip or fabricated with one laser per semiconductor chip. Monolithic integration can reduce material cost and size. Fabrication of one laser per semiconductor chip can allow individual laser screening for improved yield.

Referring to FIG. 13, array of DFB lasers 882 are mounted on planar dispersive element 884. Array of DFB lasers 882 comprises 886$a$ to 886$x$, where x is the number of DFB lasers. Planar dispersive element 884 comprises a planar lightwave circuit (PLC) with waveguides 890$a$-890$x$, first slab waveguide 892, waveguide array 894 and second slab waveguide 896. Planar dispersive element 884 combines the DFB wavelengths into one fiber. DFB lasers are mounted along the edge of planar dispersive element 884 with a DFB laser element aligned with a corresponding waveguide 890. Waveguides 890 transport light to first slab waveguide 892 at one end of waveguide array 894. Second slab waveguide 896 is at the other end of waveguide array 894 from first slab waveguide 892 and located at an edge of the PLC such that light from second slab waveguide 896 propagates into free space. Planar dispersive element 884 can be interfaced then with a beam steering element, planar light connector and control system, which can be similar to the beam steering element 806, planar light connector 808 and control system 810 of FIG. 12. DFB lasers typically produce higher maximum power than VCSELs. VCSELs generally can be high speed and efficient at lower powers than DFBs.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An adjustable optical telecommunication transmitter comprising:
   a plurality of light emitting elements that emit optical signals along adjacent light paths and at specific wavelengths chromatically spaced and distinct from each other;
   a dispersive element comprising a dispersive structure, a first interface providing a plurality of optical channel paths being optically coupled to the plurality of light emitting elements and to the dispersive structure, and a conjugate spatially-extended second interface to receive a chromatically combined optical signal from the dispersive structure, wherein the dispersive element is configured to chromatically combine the optical signals received at the first interface to transmit a chromatically combined signal at the second interface; and
   an adjustable beam steering element optically connected to the first interface or to the conjugate spatially-extended second interface.

2. The adjustable optical telecommunication transmitter of claim 1 wherein the adjustable beam steering element is optically connected to the spatially-extended second interface and comprises an actuator and a controller programmed to adjust the beam steering element to adjust the direction to guide the chromatically combined optical signal to a transmission waveguide.

3. The adjustable optical telecommunication transmitter of claim 1 wherein the dispersive element is planar and the dispersive structure comprises an arrayed waveguide grating.

4. The adjustable optical telecommunication transmitter of claim 1 wherein the dispersive structure comprises an echelle grating.

5. The adjustable optical telecommunication transmitter of claim 1 wherein the plurality of light emitting elements comprise an array of lasers.

6. The adjustable optical telecommunication transmitter of claim 1 wherein the plurality of light emitting elements comprises a series of individual lasers selected for wavelength and directly attached to the first interface of the dispersive element.

7. The adjustable optical telecommunication transmitter of claim 1 wherein the beam steering element comprises a mirror and a MEMS device configured to adjust the angle of the mirror relative to the dispersive element.

8. The adjustable optical telecommunication transmitter of claim 1 wherein the dispersive structure is planar and wherein the beam steering device comprises a planar cantilever structure integrated into a planar structure comprising the dispersive element.

9. The optical telecommunication transmitter of claim 8 wherein the planar cantilever structure includes a waveguide to guide an optical signal.

10. The optical telecommunication transmitter of claim 8 wherein the planar cantilever structure is moved through electrostatic actuation.

11. The adjustable optical telecommunication transmitter of claim 1 wherein the plurality of light emitting elements comprises an array of lasers and the beam steering element comprises a MEMS device, and further comprising a focusing element to focus light from the dispersive element to a transmission waveguide by way of the MEMS device wherein the angular adjustment of the MEMS device provides for chromatic grid selection.

12. The adjustable optical telecommunication transmitter of claim 1 wherein the dispersive element is a planar optical element and the spatially-extended interface comprises a slab waveguide section.

13. The adjustable optical telecommunications transmitter of claim 1 wherein the adjustable beam steering element is optically connected to the first interface.

14. The adjustable optical telecommunication transmitter of claim 1 wherein the dispersive element is planar and comprises a grating, and wherein the beam steering element comprises a first lens and an adjustable reflector with the first lens positioned between the adjustable reflector and the first interface of the planar dispersive element, wherein the angle between the optical reflector and the second interface can be adjusted to redirect the chromatically combined optical signal.

15. The adjustable optical telecommunication transmitter of claim 14 wherein the lens is about a focal length from the second interface.

16. The adjustable optical telecommunication transmitter of claim 14 wherein the grating comprises an arrayed waveguide grating and the first interface and the second interface are slab waveguides.

17. The adjustable optical telecommunication transmitter of claim 14 wherein the beam steering element is configured to guide dispersed optical signals from the plurality of light emitting elements and the first interface.

18. The adjustable optical telecommunication transmitter of claim 1 wherein the beam steering element comprises a cantilever structure with electrodes to effectuate adjustment of the position of the steerable waveguide in response to an optical signal.

19. A method for providing grid tracking with the adjustable optical telecommunication transmitter of claim 1, the method comprising adjusting the beam steering element configured to receive the chromatically combined optical signal from the optical transmitter and to direct the signal by selecting a chromatic grid with a particular center band.

20. A method for conveying multiple distinct data signals through an optical fiber, said method comprising:
   i) transmitting output from a plurality of lasers through an adjustable optical telecommunications transmitter of claim 1 to form a spectrally combined optical signal, wherein the output of each laser corresponds to an independent data signal; and
   wherein the beam steering element is automatically adjusted by a controller to maintain a signal intensity at a plurality of light receiving elements representative of the independent data signals.

21. The method of claim 20 wherein the lasers comprise vertical cavity surface emitting lasers or distributed feedback lasers and wherein the adjustable optical telecommunications transmitter comprises an AWG.

22. The method of claim 21 wherein another beam steering element is located between the AWG and the optical fiber.

23. The method of claim 20 wherein the optical fiber connects remote locations.

24. The method of claim 20 wherein the beam steering element comprises a MEMS device and a pivoting mirror operably connected to the MEMS device to provide for adjustment of the mirror orientation.

* * * * *